United States Patent
Riley et al.

(10) Patent No.: US 8,078,009 B2
(45) Date of Patent: Dec. 13, 2011

(54) OPTICAL FLOW REGISTRATION OF PANCHROMATIC/MULTI-SPECTRAL IMAGE PAIRS

(75) Inventors: Ronald A. Riley, Melbourne, FL (US); Tariq Bakir, Melbourne, FL (US); Eric Spellman, Viera, FL (US); Thomas M. McDowall, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 826 days.

(21) Appl. No.: 12/169,242

(22) Filed: Jul. 8, 2008

(65) Prior Publication Data

US 2010/0008598 A1    Jan. 14, 2010

(51) Int. Cl.
- G06K 9/00 (2006.01)
- G06K 9/32 (2006.01)
- G06K 9/36 (2006.01)
- G06K 9/40 (2006.01)
- G09G 5/00 (2006.01)
- G09G 5/02 (2006.01)

(52) U.S. Cl. ........ 382/299; 382/100; 382/162; 382/254; 382/276; 345/589; 345/606

(58) Field of Classification Search .......... 382/100, 382/162, 254, 274, 276, 284, 293, 299; 348/362, 348/364; 345/589, 606
See application file for complete search history.

(56) References Cited

U.S. PATENT DOCUMENTS

| | | |
|---|---|---|
| 5,034,986 A | 7/1991 | Karmann et al. |
| 5,265,172 A | 11/1993 | Markandey et al. |
| 5,324,113 A | 6/1994 | Ingram, Jr. et al. |
| 5,627,905 A | 5/1997 | Sebok et al. |
| 5,680,487 A | 10/1997 | Markandey |
| 5,884,226 A | 3/1999 | Anderson et al. |

(Continued)

FOREIGN PATENT DOCUMENTS

CA    2670611 A1    6/2008

(Continued)

OTHER PUBLICATIONS

Thomas, C.; Ranchin, T.; Wald, L.; Chanussot, J.; , "Synthesis of Multispectral Images to High Spatial Resolution: A Critical Review of Fusion Methods Based on Remote Sensing Physics," Geoscience and Remote Sensing, IEEE Transactions on , vol. 46, No. 5, pp. 1301-1312, May 2008.*

(Continued)

Primary Examiner — Anand Bhatnagar
Assistant Examiner — Nathan Bloom
(74) Attorney, Agent, or Firm — Fox Rothschild, LLP; Robert J. Sacco

(57) ABSTRACT

A method for processing remotely acquired imagery includes obtaining imagery data defining a first image of a panchromatic image type, the first image having a first spatial resolution, and obtaining imagery data defining a second image of a multi-spectral image type, the second image having a second spatial resolution lower than the first spatial resolution. The method also includes obtaining a mapping function specifying a position of pixels in the first image with respect to pixels in the second image and adapting the mapping function to a high common spatial resolution higher than the second spatial resolution. The method further includes generating a third set of imagery data defining a third image of a panchromatic type based on the first set of imagery data and the adapted mapping function and having the high common spatial resolution and adjusting the mapping function based on a first difference between the first and the third images at the high common spatial resolution.

20 Claims, 5 Drawing Sheets

U.S. PATENT DOCUMENTS

| | | | |
|---|---|---|---|
| 5,949,914 | A | 9/1999 | Yuen |
| 6,011,875 | A | 1/2000 | Laben et al. |
| 6,097,835 | A | 8/2000 | Lindgren |
| 6,937,774 | B1 | 8/2005 | Specht et al. |
| 7,298,922 | B1 * | 11/2007 | Lindgren et al. ............... 382/294 |
| 7,369,229 | B2 | 5/2008 | Bissett, III et al. |
| 7,400,770 | B2 | 7/2008 | Keaton et al. |
| 7,491,944 | B1 | 2/2009 | Stork et al. |
| 7,620,203 | B1 | 11/2009 | Simmons et al. |
| 2002/0096622 | A1 | 7/2002 | Adler-Golden et al. |
| 2004/0075667 | A1 | 4/2004 | Burky et al. |
| 2004/0130702 | A1 | 7/2004 | Jupp et al. |
| 2004/0141659 | A1 | 7/2004 | Zhang |
| 2004/0164235 | A1 | 8/2004 | Miller |
| 2004/0264796 | A1 | 12/2004 | Turner et al. |
| 2005/0094887 | A1 | 5/2005 | Cakir et al. |
| 2005/0111754 | A1 | 5/2005 | Cakir et al. |
| 2006/0126959 | A1 | 6/2006 | Padwick et al. |
| 2006/0269158 | A1 | 11/2006 | O'Hara et al. |
| 2008/0037865 | A1 | 2/2008 | Vetter et al. |
| 2008/0037869 | A1 | 2/2008 | Zhou |
| 2008/0089558 | A1 * | 4/2008 | Vadon et al. ................. 382/113 |
| 2008/0112649 | A1 | 5/2008 | Chen et al. |
| 2008/0129752 | A1 | 6/2008 | Riley et al. |
| 2008/0131024 | A1 | 6/2008 | Riley et al. |
| 2008/0131025 | A1 | 6/2008 | Riley et al. |
| 2010/0002947 | A1 | 1/2010 | Riley et al. |
| 2010/0008595 | A1 | 1/2010 | Riley et al. |
| 2010/0032557 | A1 | 2/2010 | Schiller |
| 2010/0189363 | A1 | 7/2010 | Riley et al. |
| 2010/0226570 | A1 | 9/2010 | Riley et al. |

FOREIGN PATENT DOCUMENTS

| | | |
|---|---|---|
| WO | WO 98/41079 | 9/1998 |
| WO | WO 2006/065741 | 6/2006 |
| WO | WO 2008/067517 | 6/2008 |
| WO | WO 2008/070542 | 6/2008 |
| WO | WO 2008/070544 | 6/2008 |

OTHER PUBLICATIONS

Alparone, L..; Wald, L..; Chanussot, J..; Thomas, C..; Gamba, P..; Bruce, L.M.; , "Comparison of Pansharpening Algorithms: Outcome of the 2006 GRS-S Data-Fusion Contest," Geoscience and Remote Sensing, IEEE Transactions on , vol. 45, No. 10, pp. 3012-3021, Oct. 2007.*

Garzelli, A.; Nencini, F.; Capobianco, L.; , "Optimal MMSE Pan Sharpening of Very High Resolution Multispectral Images," Geoscience and Remote Sensing, IEEE Transactions on , vol. 46, No. 1, pp. 228-236, Jan. 2008.*

Yi Yang; Chongzhao Han; Xin Kang; Deqiang Han; , "An Overview on Pixel-Level Image Fusion in Remote Sensing," Automation and Logistics, 2007 IEEE International Conference on , vol., no., pp. 2339-2344, Aug. 18-21, 2007.*

Sheng Zheng; Wen-zhong Shi; Jian Liu; Jinwen Tian; , "Remote Sensing Image Fusion Using Multiscale Mapped LS-SVM," Geoscience and Remote Sensing, IEEE Transactions on , vol. 46, No. 5, pp. 1313-1322, May 2008.*

Joshi, M.; Jalobeanu, A.; , "Multiresolution Fusion in Remotely Sensed Images Using an IGMRF Prior and Map Estimation," Geoscience and Remote Sensing Symposium, 2008. IGARSS 2008. IEEE International , vol. 2, no., pp. II-269-II-272, Jul. 7-11, 2008.*

Bunting, P. et al: "An Area Based Technique for Image-to-Image Registration of Multi-Modal Remote Sensing Data", Geoscience and Remote Sensing Symposium, 2008. IGARSS 2008. IEEE International, IEEE, Piscataway, NJ, USA, Jul. 7, 2008, pp. V-212, XP031423198.

Walli. K C: "Automated Multisensor Image Registration", Applied Imagery Pattern Recognition Workshop, 2003. Proceedings. 32nd Washington, DC, USA Oct. 15-17, 2003, Piscataway, NJ, USA, IEEE, Oct. 15, 2003, pp. 103-107, XP010695062.

Lemoigne, J. et al: "Use of Multiresolution Wavelet Feature Pyramids for Automatic Registration of Multisensor Imagery", IEEE Transactions on Image Processing, IEEE Service Center, Piscataway, NJ, US, vol. 14, No. 6, Jun. 1, 2005, pp. 770-782, XP011131847.

Chi-Farn Chen et al: "Fully Automatic and Robust Approach for Remote Sensing Image Registration", Nov. 13, 2007, Progress in Pattern Recognition, Image Analysis and Applications; [Lecture Notes in Computer Science], Springer Berlin Heidelberg, Berlin, Heidelberg, pp. 891-900, XP019083038.

International Search Report mailed Jan. 11, 2011; International Application No. PCT/US2009/049855 in the name of Harris Corporation.

Aanaes, H., et al: "Spectrally Consistent Satellite Image Fusion With Improved Image Priors", 2006 7th Nordic Signal Processing Symposium (IEEE Cat. No. 06EX1392) IEEE Piscataway, NJ USA, Jun. 7-9, 2006, pp. 14-17, XP002482502; ISBN: 1-4244-0413-4.

Ager; T.P., et al: "Geo-Positional Accuracy Evaluation of QuickBird Ortho-Ready Standard 2A Multispectral Imagery", Proceedings SPIE, Algorithms and Technologies for Multispectral, Hyperspectral, and Ultraspectral Imagery X, Aug. 12, 2004, pp. 488-499, XP040185047.

Aiazzi, B., et al: "Context-Driven Fusion of High Spatial and Spectral Resolution Images Based on Oversampled Multiresolution Analysis", IEEE Transactions on Geoscience and Remote Sensing, vol. 40, No. 10, Oct. 2002, pp. 2300-2312.

Aiazzi, B., et al: "An MTF-Based Spectral Distortion Minimizing Model for Pan-Sharpening of Very High Resolution Multispectral Images of Urban Areas", 2nd GRSS/ISPRS Joint Workshop on Data Fusion and Remote Sensing Over Urban Areas, pp. 90-94, 2003.

Becker, S., et al: 2005. "Determination and Improvement of Spatial Resolution for Digital Aerial Images", Proceedings of ISPRS Hannover Workshop 2005: High-Resolution Earth Imaging for Geospatial Information, unpaginated CD-ROM, 6p.

Beisl U.: "BDRF Correction in Hyperspectral Imagery", European Space Agency-Publications, 2001, XP002589098.

Beisl, U., et al: "Correction of Atmospheric and Bidirectional Effects in Multispectral ADS40 Images for Mapping Purposes", Internet, Intl. Arch. Photogramm. Remote Sens 2004, XP002588221, Retrieved from the Internet: URL:http://www2.geog.ucl.ac.uk/{mdisney/teaching/PPRS/PPRS_5/orig/atmos_empirical.pdf [retrieved on Jun. 14, 2010].

Eismann, M.T. et al: "Hyperspectral Resolution Enhancement Using High-Resolution Multispectral Imagery With Arbitrary Response Functions", IEEE Transactions on Geoscience and Remote Sensing, IEEE Service Center, Piscataway, NJ, US., vol. 43, No. 3, Mar. 2005, pp. 455-465, ISSN: 0196-2892, p. 456-459.

Garzelli, A., et al: "Interband Structure Modeling for Pan-Sharpening of Very High-Resolution Multispectral Images", Information Fusion Elsevier USA, vol. 6, No. 3, Sep. 2005, pp. 213-224, XP004858824, ISSN: 1566-2535.

Hardie R.C., et al: "MAP Estimation for Hyperspectral Image Resolution Enhancement Using an Auxiliary Sensor", IEEE Transactions on Image Processing, vol. 13, No. 9, Sep. 2004, pp. 1174-1184.

Liu, J.G.: "Smoothing Filter Based Intensity Modulation: A Spectral Preserve Image Fusion Technique for Improving Spatial Details", Int. J. Remote Sensing, Dec. 2000, pp. 3461-3472, vol. 21, No. 18, XP008110993.

Khan, M.M. et al: "Indusion: Fusion of Multispectral and Panchromatic Images Using the Induction Scaling Technique", IEEE Geoscience and Remote Sensing Letters, IEEE Service Center, Jan. 1, 2008, pp. 98-102, vol. 5, No. 1, New York, New York US, XP011197256.

Perkins, T, et al.: "Retrieval of Atmospheric Properties from Hyper and Multispectral Imagery with the FLASH Atmospheric Correction Algorithm" SPIE, PO Box 10 Bellingham WA 98227-0010 USA, vol. 5979, Oct. 31, 2005, XP040211109.

Price J.C.: "Combining Panchromatic and Multispectral Imagery from Dual Resolution Satellite Instruments", Remote Sensing of Environment, No. 21, 1987, pp. 119-128, XP002588220.

Ranchin, T. et al: "Image Fusion—The ARSIS Concept and Some Successful Implementation Schemes" ISPRS J. Photogramm. Remote Sens.; ISPRS Journal of Photogrammetry and Remote Sensing, Jun. 2003, vol. 58, No. 1-2, pp. 4-18, XP002469989.

Richter et al.: "Influence of the Adjacency Effect on Ground Reflectance Measurements", IEEE Geoscience and Remote Sensing Letters, IEEE Service Center, New York, NY, US, vol. 3, No. 4, Oct. 1, 2006, pp. 565-569, XP011149586, ISSN 1545-598X.

Schiefer, S. et al: Correcting Brightness Gradient in Hyperspectral Data From Urban Areas, Remote Sensing of Environment, No. 101, 2006, pp. 25-37, XP002588219.

Schowengerdt, R.: "Remote Sensing: Models and Methods for Image Processing", Dec. 31, 2007, Academic Press, XP002558565, ISBN: 9780123694072.

Thomas C. et al: "Synthesis of Multispectral Images to High Spatial Resolution: A Critical Review of Fusion Methods Based on Remote Sensing Physics" IEEE Transactions on Geoscience and Remote Sensing, IEEE Service Center, Piscataway, NJ, US, vol. 46, No. 5, May 2008, pp. 1301-1312.

Zhang, Y: "Understanding Image Fusion", Photogrammetric Engineering & Remote Sensing, Jun. 2004, pp. 657-661.

Xu, C, et al: "Evaluation of the Surface Reflectance Retrieval on the Satellite Data", SPIE, PO Box 10, Bellingham WA 98227-0010 USA, vol. 6752, Aug. 8, 2007, XP040247396.

Kim, Y., et al: "An Experimental Study on the Image-Based Atmospheric Correction Method for High Resolution Multispectral Data", Geoscience and Remote Sensing Symposium, 2005, Igarss 2005, Proceedings, 2005 IEEE International Seoul, Korea, Jul. 25-29, 2005, pp. 434-436, vol. 1, Piscataway, New Jersey USA, XP010849008.

Information about Related Patent Applications, see section 6 of the accompanying Information Disclosure Statement Letter, which concerns Related Patents and Patent Applications, Sep. 27, 2011.

* cited by examiner

200

OPTICAL FLOW REGISTRATION OF PANCHROMATIC/MULTI-SPECTRAL IMAGE PAIRS

BACKGROUND OF THE INVENTION

1. Statement of the Technical Field

The invention concerns image processing, and more particularly, an image processing method for images having different spatial and spectral resolutions.

2. Description of the Related Art

In the field of remote image sensing, two common types of images include panchromatic imagery and multi-spectral imagery. Panchromatic imagery is imagery that is obtained by a remote sensing device with a sensor designed to detect electromagnetic energy in only one very broad band. This one very broad band typically includes most of the wavelengths of visible light. Panchromatic imagery has the advantage of offering very high spatial resolution. In contrast, multi-spectral imagery is typically created from several narrow spectral bands within the visible light region and the near infrared region. Consequently, a multi-spectral image is generally comprised of two or more image data sets, each created by sensors responsive to different portions of the optical spectrum (e.g., blue, green, red, infrared). Multi-spectral images are advantageous because they contain spectral information which is not available from a similar panchromatic image. However, multi-spectral images typically have a lower spatial resolution as compared to panchromatic images.

It is often desirable to enhance a multi-spectral image with the high resolution of a panchromatic image and vice versa. Typically this process is referred to as "fusing" of the image pair. In general, there are several requirements for successfully accomplishing the fusing process. One requirement is the need for registration of the two images. The registration process involves a determination of where each pixel in the panchromatic image maps to a location in the multi-spectral image. This process must generally be accomplished with great accuracy for best results. For example, it is desirable for each pixel in the pan image to be mapped to the multi-spectral image with an accuracy of less than 0.1 panchromatic pixel radius.

A number of conventional methods exist for registering image pairs. In one method, registration is estimated based on the phase shift in the Fourier domain. That is, one of the images is shifted in the Fourier domain to match the second image. In another method, the sensor model for the acquired images is adjusted to project a small number of match points to a common flat earth. Typically, in such methods, the imaged location is assumed to be static and nearly flat, resulting in a smooth mapping such as an affine or projective transform. In some instances, known topographical information, such as in a digital elevation model (DEM), may be used to adjust the transform. However, such mapping methods can require an extensive amount of computation to match up and align all the pixels in the image pair to be combined.

SUMMARY OF THE INVENTION

The present invention concerns systems and methods for processing remotely acquired imagery. In a first embodiment of the present invention, a method for processing remotely acquired imagery is provided. The method includes the steps of obtaining imagery data defining a first image of a panchromatic image type, the first image having a first spatial resolution; obtaining imagery data defining a second image of a multi-spectral image type, the second image having a second spatial resolution lower than the first spatial resolution; obtaining a mapping function specifying a position of pixels in the first image with respect to pixels in the second image; adapting the mapping function to a high common spatial resolution higher than the second spatial resolution; generating a third set of imagery data defining a third image of a panchromatic type based on the first set of imagery data and the adapted mapping function and having the high common spatial resolution; and adjusting the mapping function based on a first difference between the first and the third images at the high common spatial resolution.

In a second embodiment of the present invention, a system for processing remotely acquired imagery data is provided. The system includes a mass storage for receiving imagery data comprising imagery data defining a first image of a panchromatic image type having a first spatial resolution and a second image of a multi-spectral image type, the second image having a second spatial resolution lower than the first spatial resolution. The system also includes a processing element configured for: obtaining a mapping function specifying a position of pixels in the first image with respect to pixels in the second image; adapting the mapping function to a high common spatial resolution higher than the second spatial resolution; generating a third set of imagery data defining a third image of a panchromatic type based on the first set of imagery data and the adapted mapping function and having the second spatial resolution; and adjusting the mapping function based on a first difference between the first and the third images at the high common spatial resolution.

In a third embodiment of the present invention, a computer-readable storage, having stored thereon a computer program for processing remotely acquired imagery is provided. The computer program includes a plurality of code sections executable by a computer to cause the computer to perform the steps of: obtaining imagery data defining a first image of a panchromatic image type, the first image having a first spatial resolution; obtaining imagery data defining a second image of a multi-spectral image type, the second image having a second spatial resolution lower than the first spatial resolution; obtaining a mapping function specifying a position of pixels in the first image with respect to pixels in the second image; adapting the mapping function to a high common spatial resolution higher than the second spatial resolution; generating a third set of imagery data defining a third image of a panchromatic type based on the first set of imagery data and the adapted mapping function and having the high common spatial resolution; and adjusting the mapping function based on a first difference between the first and the third images at the high common spatial resolution.

DETAILED DESCRIPTION OF THE PREFERRED EMBODIMENTS

Embodiments of the present invention provide systems and methods for adjusting remotely acquired imagery. In particular, the various embodiments of the present invention provide systems and methods for improving registration, i.e., alignment, of remotely acquired image pairs. As previously discussed, using conventional methods for improving alignment of image pairs is a time-consuming and computation intensive process, especially as the number of data points in such images increases. For example, the typical panchromatic (8000×8000 pixels) and multi-spectral (2000×2000 pixels for each band) image pair typically requires analysis of over 75 million data points. As a result, when dealing with a large number of images, such analysis methods can be prohibitively long.

However, the amount of computation needed can be reduced under two conditions: (1) reduced number of data points; and (2) a high degree of alignment already existing. Therefore, embodiments of the present invention are directed at systems and method for generating a mapping function based on a comparison of the image pairs converted to different resolutions. In particular, embodiments of the present invention provide systems and methods for first aligning image pairs downsampled to a low resolution to generate an initial mapping function (using a low number of data points). The mapping function can then be refined as image pairs are successively compared at higher resolutions (starting with a high degree of alignment). Once the mapping function is acceptably refined, the mapping function can be used during an image pair fusion process.

Figure 1:
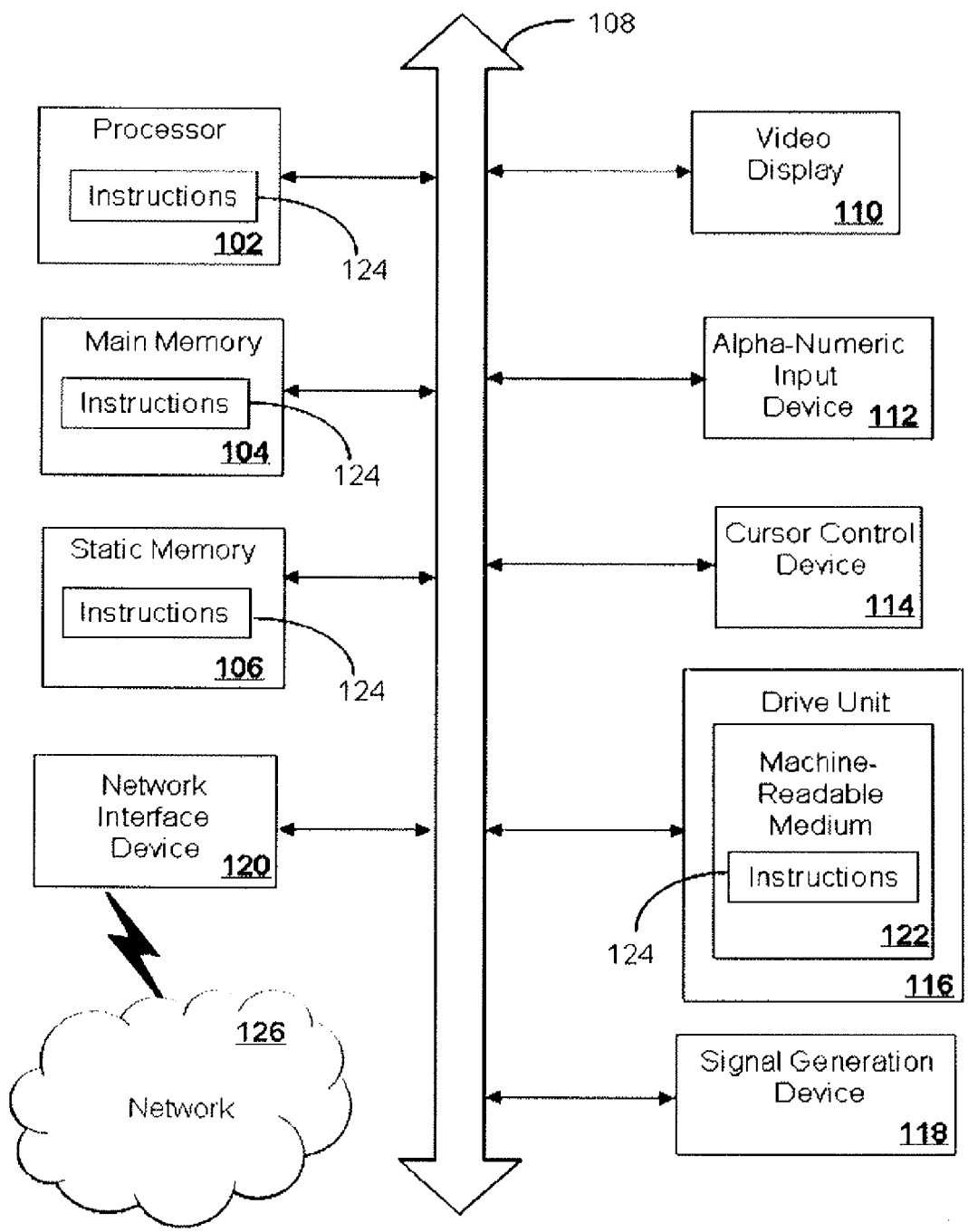
FIG. 1 is a schematic view of a computer system within which a set of instructions operate according to an embodiment of the invention.

The various embodiments of present invention are specifically embodied as a method, a data processing system, and a computer program product for generating mapping functions for image pairs. Accordingly, the present invention can take the form as an entirely hardware embodiment, an entirely software embodiment, or any combination thereof. However, the invention is not limited in this regard and can be implemented in many other forms not described herein. For example, FIG. 1 is a schematic diagram of an embodiment of a computer system 100 for executing a set of instructions that, when executed, causes the computer system 100 to perform one or more of the methodologies and procedures described herein. In some embodiments, the computer system 100 operates as a standalone device. In other embodiments, the computer system 100 is connected (e.g., using a network) to other computing devices. In a networked deployment, the computer system 100 operates in the capacity of a server or a client developer machine in server-client developer network environment, or as a peer machine in a peer-to-peer (or distributed) network environment.

In the some embodiments, the computer system 100 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 100 includes a processor 102 (such as a central processing unit (CPU), a graphics processing unit (GPU, or both), a main memory 104 and a static memory 106, which communicate with each other via a bus 108. The computer system 100 further includes a display unit 110, such as a video display (e.g., a liquid crystal display or LCD), a flat panel, a solid state display, or a cathode ray tube (CRT)). The computer system also includes an input device 112 (e.g., a keyboard), a cursor control device 114 (e.g., a mouse), a disk drive unit 116, a signal generation device 118 (e.g., a speaker or remote control) and a network interface device 120.

The disk drive unit 116 includes a computer-readable storage medium 122 on which is stored one or more sets of instructions 124 (e.g., software code) configured to implement one or more of the methodologies, procedures, or functions described herein. The instructions 124 reside, completely or at least partially, within the main memory 104, the static memory 106, and/or within the processor 102 during execution thereof by the computer system 100. The main memory 104 and the processor 102 also can constitute machine-readable media.

Those skilled in the art will appreciate that the computer system architecture illustrated in FIG. 1 is one possible example of a computer system. However, the invention is not limited in this regard and any other suitable computer system architecture can also be used without limitation.

For example, dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

Therefore, in some embodiments of the present invention, the present invention is embodied as a computer-readable storage medium containing instructions 124 or that receives and executes instructions 124 from a propagated signal so that a device connected to a network environment 126 sends or receive voice and/or video data and that communicate over the network 126 using the instructions 124. The instructions 124 are further transmitted or received over a network 126 via the network interface device 120.

While the computer-readable storage medium 122 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Figure 2:
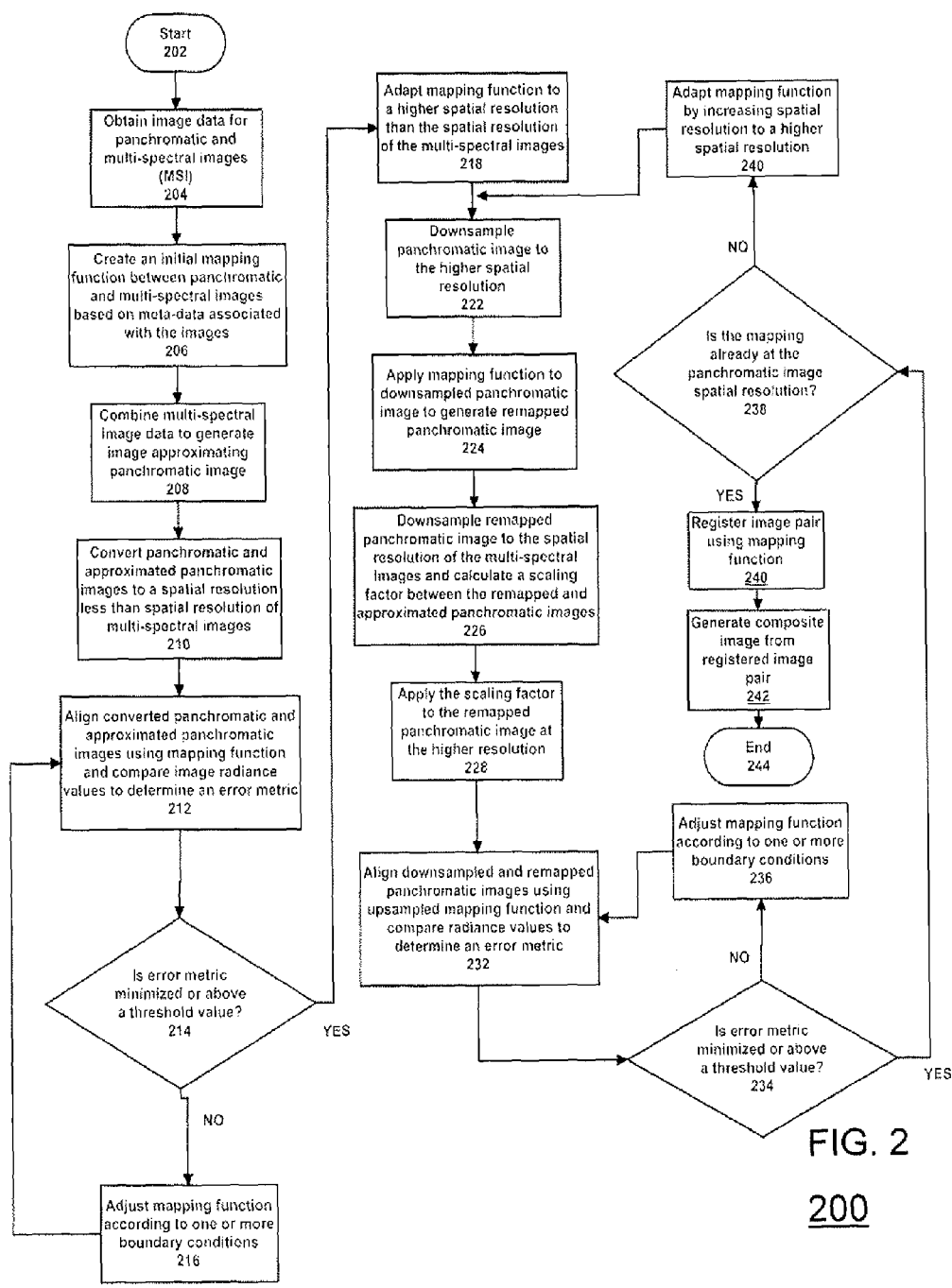
FIG. 2 is a flowchart of steps in an exemplary method for processing remotely acquired imagery according to an embodiment of the present invention.

The present invention will now be described in greater detail in relation to the flowchart in FIG. 2, illustrating steps in an exemplary method 200 for processing remote imagery data based according to the various embodiments of the present invention. It should be appreciated, however, that the exemplary process disclosed in FIG. 2 is provided for purposes of illustration only and that the present invention is not limited in this regard.

As shown in FIG. 2, the method 200 can start with step 202 and continue on to step 204. In step 204, the remote imagery data is obtained. As used herein, "remote imagery data" refers to any set of data defining an image pair. That is, the remote imagery data includes image data and any type of meta-data associated with a first and at least a second image to be combined. The image data is acquired from any remotely positioned sensor or imaging device. For example, the remote sensor can be positioned to operate on, by way of example and not limitation, an elevated viewing structure, an aircraft, a spacecraft, or man-made satellite. That is, the remote data is acquired from any position, fixed or mobile, that is elevated with respect to the imaged location. The image data can include light intensity data for an image acquired using only a particular range of wavelengths (i.e., a spectral band). Therefore, in the various embodiments of the present invention, the remote imagery data comprises multi-spectral (~4 bands), hyper-spectral (>100 bands), and/or panchromatic (visible band) image data.

The remote imagery data described herein are further assumed to have certain other characteristics. During the time between collection of the various images, moving objects such as vehicles and ocean waves are not likely to be registered correctly between the two images, leading to error in registration and calibration. If the time between the acquisitions of the images is more than a few minutes, the change in position of the sun will result in significant changes in shadows and variations in the illumination of the surface based on how well the surface normals are aligned with the sun. This can result in significant calibration and registration errors. If days pass between the collection of the images, there can be significant changes in atmospheric conditions. If months pass, there can be significant changes in the surface properties due to ice, snow, rain, leaves falling from the trees, new growth. Therefore, one of ordinary skill in the art will recognize that better results are obtained in subsequent processes for combining the images if the different images can be acquired within a very short time frame of each other. Similarly, the different images can also be acquired from nearly the same position to further reduce registration errors. Still, it will be understood by those skilled in the art that the present invention can be utilized in connection with different images that do not satisfy these criteria, possibility with degraded results. Accordingly, image pairs can be obtained using differently positioned sensors, obtained at different times, or both. However, such image pairs can result in more complex registration processes, including more complex or multiple shifting, scaling, and rotation processes. As used herein, a "composite image" refers to any image resulting from the combination of any types of image data. For example, a composite image is produced from the combination of the image data from each spectral band in multi-spectral or hyper-spectral imagery. However, the invention is not limited in this regard and a composite image can be produced from the fusion of multi-spectral or hyper-spectral image data with panchromatic image data.

For exemplary method 200, the remote imagery data comprises an image pair including panchromatic and multi-spectral images and associated meta-data. By way of example and not limitation, the meta-data includes information identifying a date, a time, and the geographic location for the images. For example, geographic coordinates for the four corners of a rectangular image can be provided in the meta-data. Other information can also be included in the meta-data, including any additional information regarding the sensor or the location being imaged.

Once the image pair is obtained in step 204, an initial mapping function for registering, i.e., aligning, the pixels in the image pair is created in step 206. In general, step 206 involves generating a mathematical function based on determining where each point in the panchromatic image maps to coordinates in the multi-spectral image. A number of conventional methods exist for generating the mapping function. Typically, they involve selecting a number of points in one image, finding where they map to in the other image, and then optimizing the coefficients of a transform. This is usually a least squares error solution that permits one to obtain a set of coefficients that minimize the squared error of mapping points from one image to another. For best results in the fusing process, the panchromatic image is preferably mapped to the multi-spectral image with an accuracy defined by a error distance which is less than a dimension defined by 0.1 panchromatic pixel. The mapping function created in step 206 determines the mapping of points from the coordinates of one image to the coordinates of the other image. This mapping function can be as simple as a linear transformation of the form $x_1 = ax_2 + by_2 + x_0$, or a complex transformation modeling the geometry of both sensors and the surface imaged. The mapping function can be based on coordinates included within the imagery data as meta-data. For example, the meta-data can include latitude and longitude coordinates of the four corners of the acquired image pairs and the initial mapping function can be based on these coordinates.

Once the initial mapping function is created in step 206, the multi-spectral image data is combined to generate an approximated panchromatic image in step 208. In particular, the approximated panchromatic image is generated from multi-spectral image data calibrated to accurately correspond to the radiance values of pixels of the panchromatic image. Therefore, prior to generating the approximated panchromatic image, the spectral weights of the radiance values for the spectral bands comprising the multi-spectral image need to be determined. As used herein, the term "radiance value" generally refers to a digital value assigned to a pixel which is intended to represent the intensity of light energy received by a sensor at the location defined by that pixel. In this regard, it should be understood that these radiance values may be scaled differently in two different sensors. Accordingly, it will be appreciated that the radiance values from the two different sensors must somehow be adjusted or scaled by using suitable weighting factors before the radiance values from the two different sensors can be combined together in a meaningful way. This process is referred to as calibration.

Figure 3:
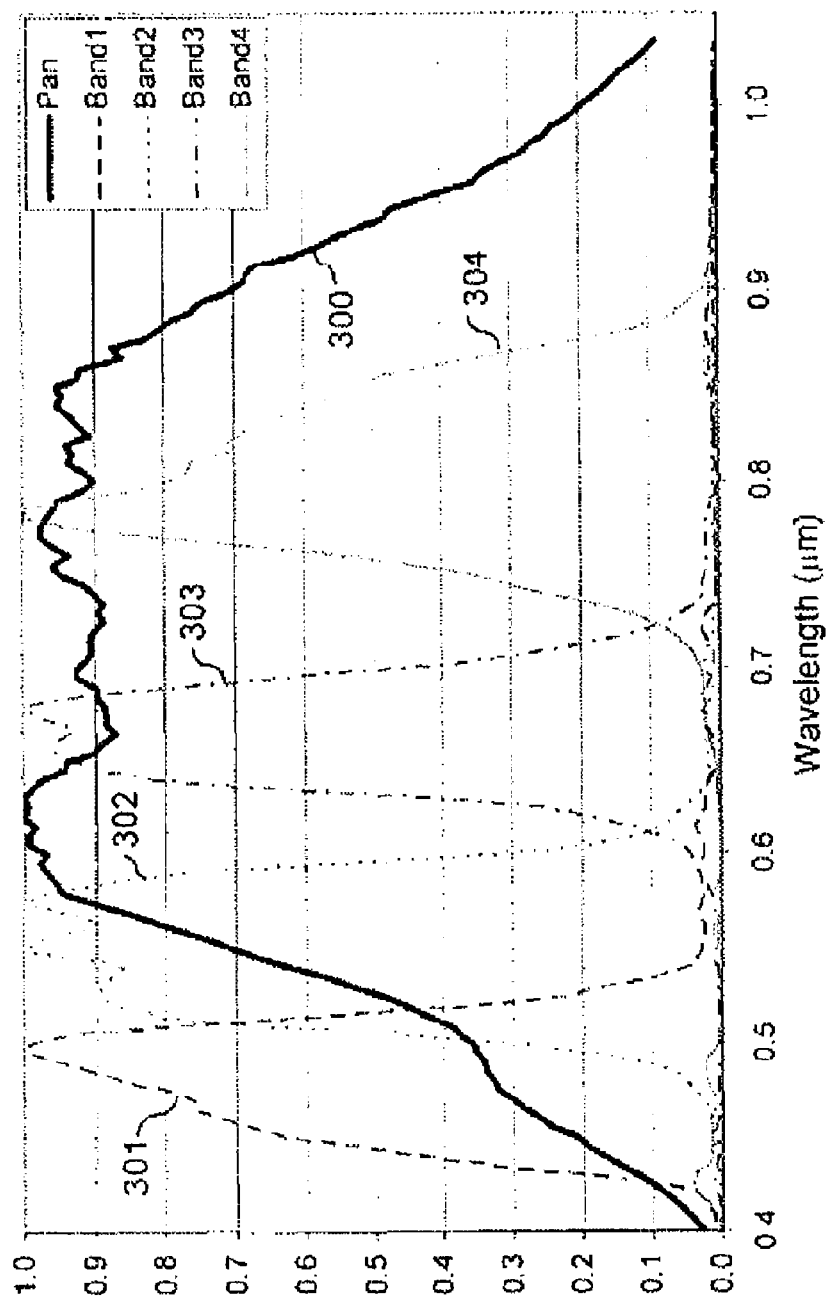
FIG. 3 is a plot showing an example of a spectral response of sensors used to create a panchromatic image and a multi-spectral image that is useful for describing the present invention.

It must be understood that the complete multi-spectral image of a particular scene is actually comprised of several optical or spectral image bands. In each of these bands the sensor is responsive to a very limited range of optical wavelengths. This concept is illustrated in FIG. 3 which shows curves 301, 302, 303, 304 which represent a sensor's response to four different bands of optical wavelengths. The sensor essentially creates one image for each optical band represented by the response curves 301, 302, 303, 304. In this example, a single multi-spectral image would be comprised of images obtained by the sensor using these four spectral bands. Those skilled in the art will appreciate that different sensor systems can have more or fewer optical bands. In contrast, the panchromatic image is a single image which is obtained by a sensor that is responsive to a much wider range of optical wavelengths. In FIG. 3, the response of the panchromatic sensor is illustrated by curve 300.

Figure 4:
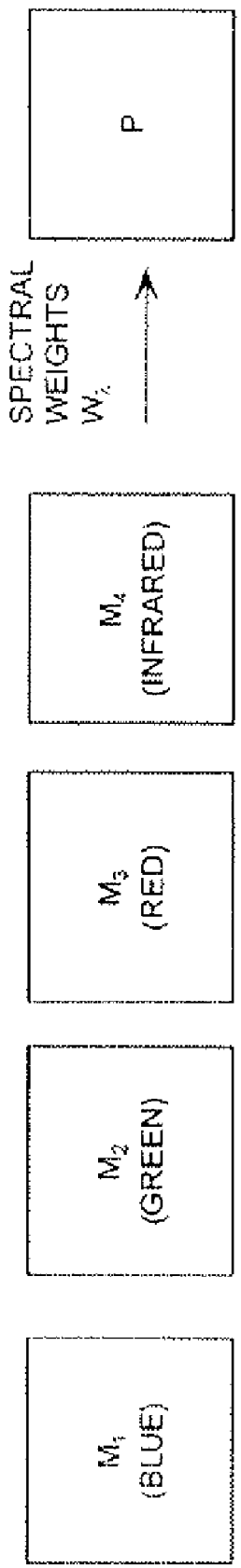
FIG. 4 is a conceptual illustration showing how spectral weights are used in a downsample processing of a multi-spectral image for decreasing the spectral resolution of the multi-spectral image that is useful for describing the present invention.

In FIG. 3, it can be seen that the response curves 301, 302, 303, 304 of the sensor for the various multi-spectral bands can be very different as compared to the response curve 300 of the panchromatic sensor for the same wavelengths. These differences in the responsiveness of the sensor to the various optical bands will result in scaling differences as between the radiance values associated with each pixel for the multi-spectral image as compared to the panchromatic image. Therefore a calibration function is needed to scale the radiance values for each pixel as measured by the multi-spectral sensor to correspond to the scaling of radiance values resulting from the panchromatic sensor. For example, consider the spectral response represented by curves 300 and 301 at 0.5 µm. The curve 301 has a spectral response of approximately 1.0 whereas the spectral response of the panchromatic sensor shows an average spectral response in the range of about 0.35. Ignoring for the moment the response of curve 302 in the wavelength range defined by curve 301, the radiance values for pixels in a multi-spectral image using a sensor having the characteristics of response curve 301 would likely need to be scaled by a weighting value of about 0.35 in order for such radiance values to be properly calibrated to those values measured by a sensor having the response indicated by curve 300. In general, proper spectral calibration would require that the pixel radiance values associated with each spectral band in FIG. 3 would need to be added together to obtain a total radiance value that is properly scaled to the radiance values obtained using a sensor having the response defined by curve 300. This process is illustrated in FIG. 4.

Mathematically, the foregoing process can be expressed as follows in equation (1):

$$P_{MSI}(i, j) = \sum_\lambda W_\lambda M_\lambda(i, j) + P_0 \quad (1)$$

Where:
$P_{MSI}(i,j)$ is the approximated panchromatic radiance of each down-sampled pixel;
$W_\lambda$ are the spectral weights for each of the spectral bands, $\lambda$;
$M_\lambda(i,j)$ is the radiance value for each pixel for each spectral band comprising the multi-spectral image; and
$P_0$ is a constant offset value.

Once the spectral weights are calibrated, the approximated panchromatic image is generated in step 208. The approximated image, being derived from a combination of multi-spectral images, will still only have the same spatial resolution as the multi-spectral images. However, when compared to the acquired panchromatic image, the differences in radiance values between the acquired and approximated panchromatic images should only be minor.

Notably, even if a mapping function is provided for mapping multi-spectral images to panchromatic images, any differences in spatial resolution and sensor position between the two images always results in some degree of misalignment and therefore problems with registration. Typically, registration problems comprise high resolution pixels from the panchromatic image which do not sufficiently overlap pixels in the corresponding low resolution multi-spectral image, even though both pixels are imaging the same location. This poor registration can then result in improper combination of the image, which causes blurring or other degradation of the composite image being formed. As a result, when a composite image is required at a high resolution, a substantial amount of computation time is required to align the images to properly register them.

As previously described, the amount of computation time for properly aligning images is based on two factors: (1) the resolution of the images to be combined, and (2) the degree of misalignment between the two images. In other words, as either the resolution of the images is reduced or the degree of misalignment is reduced, the amount of computation required for registering the images is also reduced. In the various embodiments of the present invention, these factors can be used advantageously to register images at different resolutions without extensive computations at higher resolutions. In particular, by using a comparison of acquired and approximated panchromatic images at various resolutions, the mapping function can be iteratively corrected using a reduced amount of computation. Thus, in the various embodiments of the present invention, the mapping function is coarsely corrected at lower resolutions, where the amount of computation is limited by the lower number of pixels. Subsequently, the mapping function is further adjusted at a higher resolution. However, the amount of computation for these high resolution adjustments is limited since the images have already been previously aligned at one or more lower resolutions. Therefore, the images only require only a small degree of correction at higher resolutions. The result is an overall reduced number of computations, even though multiple alignment steps are required.

Figure 5:
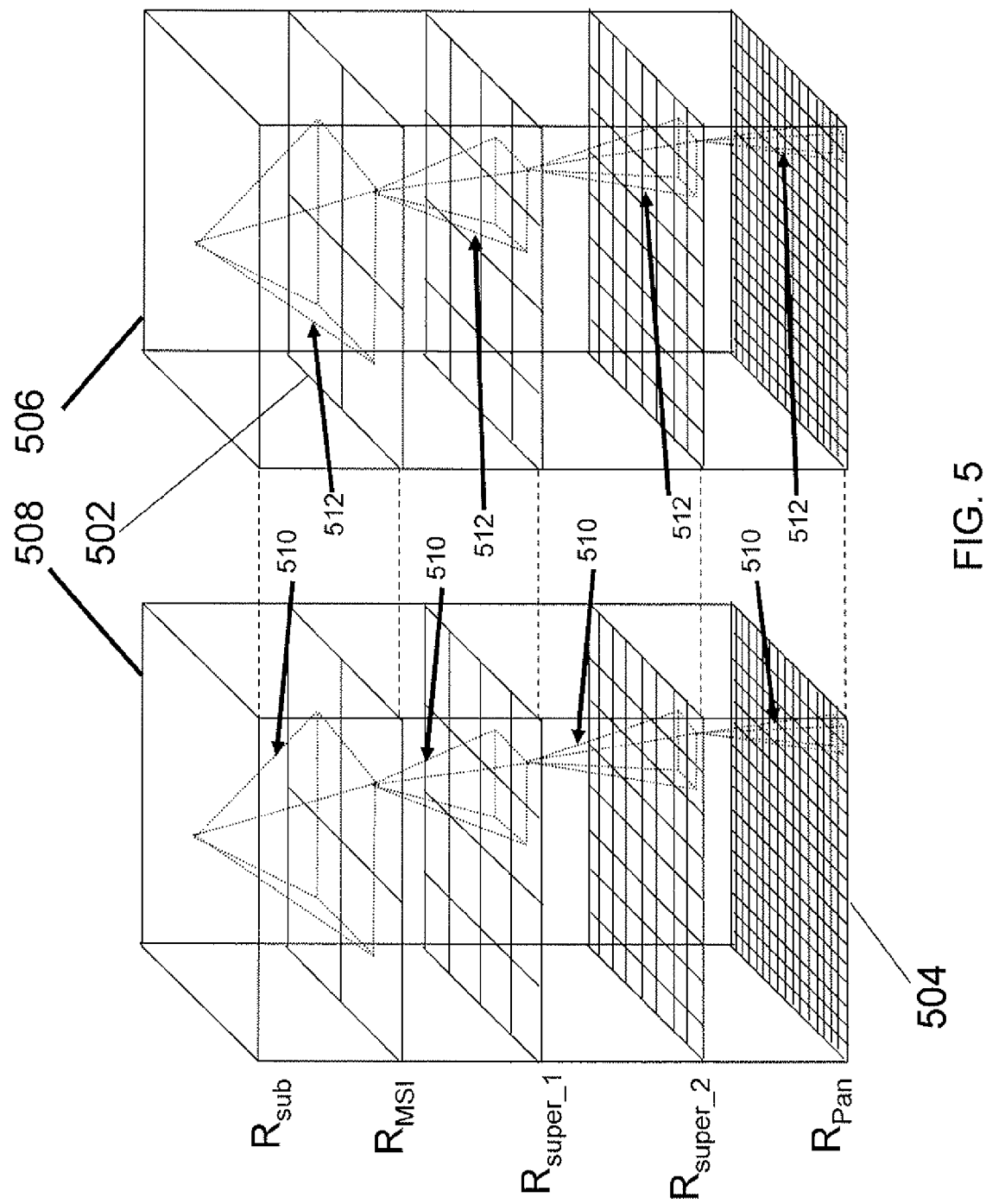
FIG. 5 is a conceptual illustration showing how image spatial resolutions are adjusted for an image pair according to the various embodiments of the present invention.

Accordingly, a first aspect of the present invention provides for generating an initial corrected mapping function by aligning the images at a low common spatial resolution. That is, the mapping function generated from the meta-data is initially corrected at a resolution where even a poor estimate of the registration is still likely to be only a fraction of a pixel. For example, as shown in FIG. 5, a low spatial resolution multi-spectral image 502 and a high spatial resolution image 504 can be converted to low resolution images 506 and 508, respectively, having the same resolution. Many downsampling techniques are available for converting the images 502 and 504 and can be used with the various embodiments of the present invention. For example, as shown in FIG. 5, pyramid functions 510 and 512 are used for generating images 506 and 508, respectively. The same pyramid functions 510 and 512 are also used to convert images 502 and 504, respectively, to any other resolutions. In such embodiments, the use of a pyramid function ensures that an image is converted to another resolution using the same scaling factors and pixel combination techniques. A "pyramid function", as used herein, refers to a function that reduces the number of pixels in an image by a factor of 2 successively over a number of layers. At each layer, non-overlapping 2×2 blocks of pixels are averaged together to produce a single pixel value in the next layer of the image, as shown in FIG. 5. Thus each layer has ¼ the number of pixels of the previous layer. Although any resolution (i.e., number of pixels) can be used for the common resolution, reducing the number of pixels below a threshold value can result in loss of too much image information. Accordingly, a minimum number of pixels can be specified for the common resolution, such as 64 pixels, to ensure that sufficient image information is available for initial registration of the images.

Referring back to FIG. 2, once an approximated panchromatic image is generated in step 208, the approximated and acquired panchromatic images are first downsampled or converted to a common low resolution below that of the multi-spectral images in step 210. For example, as shown in FIG. 5, images 502 and 504, at resolutions $R_{MSI}$ and $R_{Pan}$, respectively, can be converted to images 506 and 508, respectively, at common low resolution $R_{sub}$. Subsequently, using the mapping function created in step 206, the images are aligned and compared in step 212 to generate an error metric measuring a total difference between the radiance values for the two converted images. This initial alignment would be based on the geographic coordinates in the meta-data, for example. The total difference is then measured using an error metric. For example, a root-mean square (RMS) measurement of the overall difference between the radiance values of the two images can be determined. The error metric will contain other terms in addition to RMS to ensure a unique and desirable solution. Specifically we include terms to provide the spatially smoothest mapping between images. Afterwards, in step 214, the error metric is compared to a threshold value or a determination can be made of whether the error metric can be reduced further.

In step 216, the mapping function is adjusted to reduce the error metric. The error metric is reduced by equating the acquired and approximated panchromatic images at the low spatial resolution. That is, an assumption is made that the radiance of the downsampled panchromatic pixels should be equal to the radiance of the corresponding pixel in the downsampled approximated panchromatic image. Mathematically, this can be expressed as follows in equation (2):

$$P_{MSI}(im,jm) \sim P(M2P(im,jm)) \quad (2)$$

Where, im, im specify the downsampled coordinates in the MSI image, M2P(x,y) specifies the mapping function for mapping the panchromatic image to the MSI image, and $P_{MSI}(x,y)$ is the acquired panchromatic radiance of each pixel;

Therefore, the mathematical adjustment needed for the mapping function M2P(x,y) can be derived from equation (2):

$$P_{MSI}(im, jm) = P(M2P(im, jm))$$
$$= P_{ip+dy, jp+dx} 0 < dx, dy < 1$$
$$= [P_{ip,jp}(1-dx) + P_{ip,jp+1}dx](1-dy) +$$
$$[P_{ip+1,jp}(1-dx) + P_{ip+1,jp+1}dx]dy$$

to provide the matrix for determining the adjustment in the mapping function as follows in equation (3):

$$|\nabla_x P \; \nabla_x P| \times \left| \begin{matrix} \delta x \\ \delta y \end{matrix} \right| = P_{MSI}(im, jm) - P(M2P(im, jm)) \quad (3)$$

However, using only equation (3) to adjust the mapping function only accounts for the differences in the two images and is typically insufficient to provide a unique solution for the necessary adjustment. Therefore, in step 216, the mapping function also needs to be adjusted according to one or more boundary conditions. These boundary conditions essentially ensure that the location and distribution of radiance values in the acquired and approximated panchromatic images matches to some degree. Accordingly, a unique solution for the adjusted mapping function can then be found based on these boundary conditions.

A first and necessary boundary condition is the requirement to generally impose smoothness of the mapping between adjacent pixels. This requirement ensures that any features in the images showing a gradual or smooth change in radiance values in a particular direction or orientation are not significantly altered by the mapping function. That is, the first condition requires that a gradient in intensity in a specific direction needs to be maintained regardless after mapping function is updated. In general, the boundary condition can be imposed by using any type of smoothing function. In some embodiments of the present invention, this first boundary condition can be imposed by using a point averaging function to impose smoothness. That is, a position of a pixel is determined by calculating an average position based on the positions of existing coordinate pairs and neighbors. Mathematically, this can be expressed as follows in equation (4):

$$M2P(im,jm)=[M2P(im+di, jm+dj)+M2P(im-di, jm-dj)]/2 \quad (4)$$

Therefore, rearranging equation above to minimize difference between adjacent pixels, provides an equation (5) for imposing the boundary condition:

$$0=\tfrac{1}{2}[M2P(im+di, jm+dj)+M2P(im-di, jm-dj)]-M2P(im,jm) \quad (5)$$

Therefore:

$$0=\tfrac{1}{2}[M2P(im+di)+M2P(im-di)]-M2P(im)$$

and $$0=\tfrac{1}{2}[M2P(jm+dj)+M2P(jm-dj)]-M2P(jm)$$

impose smoothness in the x and y directions of the remapped image.

A second optional boundary condition can be a requirement that the size, shape, and orientation of objects be preserved after remapping using the mapping function. That is, the size, shape, or orientation of an object in a remapped image should essentially not be distorted after applying the mapping function. In general, the boundary condition can be imposed by using any type of rigid object translation function. In some embodiments, this second boundary condition can be imposed by providing a rigid object translation in which an affine transformation is used to preserve the features of objects in the in remapped image. Mathematically, this can be expressed as follows in equation (6):

$$M2P(im,jm) \approx M2P(im+di, jm+dj)-A(di, dj) \quad (6)$$

where $di, dj \sim 0, +/-1$ are the horizontal and vertical displacements to neighboring pixels and A is derived from an affine transform approximation of the mapping to provide equation (7) as follows:

$$(xp, yp) = M2P(im+di, jm+dj) \approx A(di, dj) + (xp_0, yp_0) \quad (7)$$

Therefore, rearranging equation (7) as shown below in equation (8) provides:

$$0 = (xp, yp) - A(di, dj) - (xp_0, yp_0) \quad (8)$$

and more particularly:

$$0 = xp - A(di, dj) - xp_0 \text{ and } 0 = yp - A(di, dj) - yp_0$$

Which impose rigid object translation in the remapped image in the x and y directions.

As a result of these imposed boundary conditions, the mapping function needs to be able to provide handle discontinuities when minimizing the difference between the acquired and approximated panchromatic images. Accordingly, discontinuities can be handled by applying weights to the boundary conditions based on the similarity of adjacent intensities. Mathematically this can be expressed as follows in equation (9):

$$W_{i,j} = \lambda \{\varepsilon + e^{-|M(im,jm) - M(im+di, jm+di)|^2 / \sigma^2}\} \quad (9)$$

Where $\lambda \sim \sigma$ and $\sigma$ is a LaGrange multiplier expressed as $\sigma = RMS(P(i,j) - P(i,j+1))$. These weights are computed at each pixel $(i, j)$ based on the difference of the pixel radiance and the radiance of a neighboring pixel or average radiance of a pair of pixels.

Accordingly, based on the boundary conditions and the weights, the matrix equation in equation (3) can be modified to include the boundary and discontinuity conditions imposed by equations (5), (8), and (9). In particular, equation (3) can be rewritten as a linear system of equations to provide the matrix equation shown below in equation (10):

$$\begin{vmatrix} \nabla_x P & \nabla_y P \\ W_0 & 0 \\ 0 & W_0 \\ \vdots & \vdots \\ W_{135} & 0 \\ 0 & W_{135} \\ W_1 & 0 \\ 0 & W_1 \\ \vdots & \vdots \\ W_8 & 0 \\ 0 & W_8 \end{vmatrix} \begin{vmatrix} \delta x \\ \delta y \end{vmatrix} = \quad (10)$$

-continued $$\begin{vmatrix} P_{MSI}(i, j) - P(M2P(i, j) \\ W_0[(x(i, j+1) + x(i, j-1))/2 - x(i, j)] \\ W_0[(y(i, j+1) + y(i, j-1))/2 - y(i, j)] \\ \vdots \\ W_{135}[(x(i-1, j+1) + x(i+1, j-1))/2 - x(i, j)] \\ W_{135}[(y(i-1, j+1) + y(i+1, j-1))/2 - y(i, j)] \\ W_1[x(i, j+1) - A_x(0, 1) - x(i, j)] \\ W_1[y(i, j+1) - A_y(0, 1) - y(i, j)] \\ \vdots \\ W_8[x(i-1, j+1) - A_x(-1, 1) - x(i, j)] \\ W_8[y(i-1, j+1) - A_y(-1, 1) - y(i, j)] \end{vmatrix}$$

In equation (10), the first row of the matrix equation minimizes the RMS error, i.e. the difference in mapping between the approximated and acquired panchromatic images, as previous described in equation (3). The next group of rows, associated with four weights $W_0$, $W_{45}$, $W_{90}$ and $W_{135}$, impose the first boundary condition to impose smoothness, as described above for equation (8). These rows provide a set of linear equations in the form:

$$\delta x - [(x(di, dj) + x(di, -dj)/2 - x] = 0 \text{ and } \delta y - [(y(di, dj) + y(-di, -dj)/2 - y] = 0$$

where $i = 0, 45, 90, 135$, corresponding to the four lines passing through a center pixel and the pairs of neighboring pixels in a $3\times3$ pixel box. That is, each line passes through the center pixel and a first and second neighboring pixels on opposite sides of the center pixel. The four weights are based on the difference in radiance of the center pixel and the average radiance of the two neighboring pixels affected by these equations.

Similarly, the final group of rows, associated with the eight weights $W_1$ to $W_8$, imposes the second boundary condition to preserve shape, size, and orientation of objects in the image, as shown above in equation (5). These eight weights determine how much a given pixel is affected by the eight neighboring pixels in the $3\times3$ pixel box. These rows provide a set of linear equations in the form:

$$\delta x - [x(di, dj) - A_x(di, dj) - x] = 0 \text{ and } \delta y - [y(di, dj) - A_y(di, dj) - y] = 0$$

where $i = 1, 2, \ldots 8$. The eight weights are based on the difference in radiance of the center pixel and the radiance of the single neighboring pixel affected by these equations.

The adjustment process in step 216 can continue by solving the matrix equation (4) to determine the changes in the mapping function. The solution to the equation can be found by using conventional techniques, such as the well known least-squares method:

$$[A_t A]x = A_t b$$

Where multiplying from the left by the transpose of the matrix results in a symmetric matrix equation. There are many well know methods for efficiently solving matrix equations of this form.

Once the necessary adjustment for the mapping function is determined in step 216, the downsampled acquired and approximated panchromatic images are repeatedly compared in step 212 and the mapping function is repeatedly adjusted in step 216 until an acceptable solution has been found in step 214. However, the resulting mapping function generally will still require additional adjustment in order to be used for registering images at higher resolution. That is, even though the downsampled pixels are aligned, at a higher resolution the pixels may be slightly misaligned. Without correction, at subsequently higher resolutions, the mapping function may not be able provide sufficiently accurate registration to align the images. Accordingly, a second aspect of the present invention provides for correcting these small misalignments at subsequently higher resolutions. In particular, the various embodiments of the present invention provide for essentially determining the amount of adjustment needed at a higher resolution for a mapping function corrected at a lower resolution. Therefore, at each subsequent higher resolution, the mapping function is further corrected to account for the amount of misalignment resulting as the number of pixels in the images are increased. However, even though further adjustment is needed, computations are limited due to the high degree of alignment from previous adjustments of the mapping function.

Therefore, once the adjusted mapping function in step 216 results in a downsampled image pair having an acceptable error metric or an error metric that has been found to be minimized in step 214, the method 200 continues to step 218 to perform further adjustments at subsequently higher resolutions. Typically, the purpose for providing an accurate mapping function is to be able to generate a composite image having a high spatial resolution and minimal blurring of details. For example, an accurate mapping function can be needed to generate a fused image having a high spatial resolution from the combination of a high spatial resolution panchromatic image and an upsampled low resolution multi-spectral image. Accordingly, the registration of the upsampled low resolution images at the high spatial resolution can be critical.

Unfortunately, several difficulties exist for the registration of upsampled low resolution images with high resolution images. First, there is the basic problem of initial alignment of the images, as previously discussed. However, as previously discussed, the various embodiments of the present invention can provide for basic alignment and registration of the images by adjusting of the mapping function based on a comparison of radiances of acquired and approximated panchromatic images. Despite this alignment, other problems in alignment can still persist due to the upsampling process. In particular, the upsampling process introduces artifacts into the upsampled images that cannot be correctly mapped. That is, because the radiances of pixels need to be estimated during the upsampling process, the intensity and distribution of these estimated pixels may not coincide with the intensity of pixels in the high resolution image. As a result, the composite image can have one or more portions in which features are blurred due to incorrect mapping of the estimated pixels in the upsampled image to pixels in the high resolution pixels.

Consequently, another aspect of the present invention provides for iteratively correcting the mapping function at higher resolutions, but accounting for artifacts during the upsampling process. In particular, embodiments of the present invention provide for correcting the mapping function based not only on a comparison of acquired and approximated panchromatic images at subsequently higher resolutions, but also by ensuring that the comparison is made using a corrected approximated panchromatic image. That is, an approximated panchromatic image that has been corrected for any artifacts being introduced by the upsampling process.

Accordingly, once an initial mapping function is found at step 214, the mapping function is adapted for mapping images at a high common spatial resolution higher than that of the low resolution images in step 218. The mapping function, like the images can be adapted using the same scaling function as the image being mapped. For example in the case of image 502 in FIG. 5, the mapping function can be adapted using pyramid function 510 to a high common spatial resolution comprising a first intermediate resolution $R_{super\_1}$. The factor of two in resolution between layers of the pyramid is not only a computational convenient choice. Increasing by a larger factor, such as 3 or 4, would reduce the number of layers in the pyramid but would increase the time to process each layer resulting in slower processing time for the entire pyramid. Furthermore, an increase by only a factor of two in resolution ensures that registration at a given layer is immediately accurate to a fraction of a pixel at the next higher layer. Maintaining sub-pixel accuracy is critical to the bilinear interpolation approach.

However, directly upscaling the multi-spectral image can result in artifacts being introduced into final combined image. These artifacts are due to the upsampled multi-spectral image having many pixels estimated. For example, in a typical image pair, a panchromatic image can have a resolution of 8000 by 8000 pixels, as compared to only 2000×2000 pixels for a typical multi-spectral image. Accordingly, upsampling a multi-spectral image directly to the panchromatic resolution results an additional 60 million pixels being estimated. Consequently, adjustment of the mapping function using such upsampled images can result in incorrect adjustments due to the mapping function being adjusted for artifacts in the images, rather than actual pixels in the image.

In the various embodiments of the present invention, the mapping function is therefore further adjusted based on downsampled panchromatic images. This ensures that the mapping function is based on actual pixels and not based on artifacts. In particular, following step 218, the panchromatic image is downsampled to the higher common resolution, a resolution above that of the MSI, in step 222. Afterwards, in step 224, the mapping function is used to remap the downsampled panchromatic image to generate an approximated panchromatic image in the multi-spectral spatial geometry. However, this remapped image will not correlate exactly to an upsampled version of the multi-spectral image and therefore will not include the differences in the multi-spectral image needed for adjusting the mapping function. Therefore, in step 226, a scaling function needs to be generated to adjust the remapped image prior to reflect the differences between the remapped panchromatic image and the approximated panchromatic image. That is, a mathematical function that transforms the remapped panchromatic image back into the original image. For example, in some embodiments, the scaling function can simply be a scaling factor calculated for each of the pixels:

$$S_{i,j} = P_{MSI}(i,j) / P_{MSI\_Remapped}(i,j) \tag{11}$$

Afterwards, the scaling function is upsampled to the high common spatial resolution and used to correct the remapped panchromatic image in step 228.

Once the remapped panchromatic image has been properly corrected at the high common spatial resolution in step 228 using the scaling function, the mapping function can then be properly adjusted in step 232. In step 232, the corrected remapped and the originally downsampled panchromatic images are registered using the upsampled mapping function generated in step 218. The upsampled mapping image is thus used as initial estimate of the mapping at this higher resolution and is adjusted based on a comparison of the remapped and downsampled panchromatic images. That is, these images are compared to determine an error metric for the image pair, as previously discussed in step 212. If the error metric can still be minimized or is not yet above a threshold value in step 234, the mapping function can be adjust in step 236, as previously described in step 216. Afterwards, steps 232-236 are repeated until an error metric threshold is exceeded or the error metric has been found to be minimized in step 234.

Once the adjustments at the high common spatial resolution are completed and if the high common spatial resolution is less than that of the acquired panchromatic image resolution in step 238, the mapping function is adapted to a yet higher resolution in step 240. For example, the mapping function can be adapted to a second high common spatial resolution, such as $R_{super\_2}$. In the various embodiments, as previously described, the use of a pyramid function to upsample images and functions ensures that all upsampling or downsampling of images is consistent. Steps 220-234 are then be repeated to generate an updated version of the further upsampled mapping function at the second high common spatial resolution. Although FIG. 5 only shows two intermediate resolutions, $R_{super\_1}$ and $R_{super\_2}$, the invention is not limited in this regard. One of ordinary skill in the art will recognize any number of intermediate resolutions can be used. In some embodiments, the mapping function can be upsampled to $R_{Pan}$ without using intermediate resolutions. If the higher resolution is the panchromatic image resolution in step 238, the resulting mapping function can then be used in step 240 to register the images. Afterwards, the images can be properly fused in step 244 and the method can end in step 244.

Upon reviewing the aforementioned embodiments, it would be evident to one of ordinary skill in the art that the embodiments can be modified, reduced, or enhanced without departing from the scope and spirit of the claims described below.

In first possible alternate embodiment, the error metric calculation in step 232 can be used to further reduce the amount of computation. For example, the method 200 can be terminated early if the mapping function provides sufficiently accurate registration at a lower resolution. That is, if the error metric calculated in step 232 exceeds a second higher threshold value, it can be assumed that the mapping function will already provide sufficiently accurate registration at higher resolutions. For example, a first threshold value for an RMS error metric threshold can be 0.9 and the second threshold can be 0.95. Accordingly, if the RMS error metric is between 0.9 and 0.95, the method 200 can proceed to the next high common spatial resolution, as previously discussed. However, if the RMS error metric exceeds 0.95, it can be assumed the further adjustment is not necessary and the method 200 can proceed with registering and fusing the image pair. Similarly, if it is determined that the error metric cannot be reduced further, it can be assumed that any further adjustment of the mapping function will not provide any additional accuracy in mapping the image pair. For example, if the error metric calculated in step 232 is at or near a minimum value, it can be assumed further adjustment will not provide increased accuracy in mapping.

In a second possible alternate embodiment, the number of additional intermediate resolutions to use for refining the mapping function can be varied based on the value of the error metric. For example, if the error metric calculated exceeds a higher threshold value, as described above, it can be assumed that the mapping function has already been adjusted to provide a high degree of accuracy between the image pair. Accordingly, in such embodiments, upon exceeding this higher threshold value, the next high common spatial resolution can be a higher resolution than normally would be selected. For example, if a sufficiently high RMS value is found at $R_{super\_1}$, then rather than increasing the resolution in the next iteration to $R_{super\_2}$, the resolution can instead be increased to $R_{Pan}$ or some other high common spatial resolution between $R_{Pan}$ and $R_{super\_2}$.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

We claim:

1. A method for processing remotely acquired imagery, comprising:

obtaining a first set of imagery data defining a first image of a panchromatic image type, said first image having a first spatial resolution;

obtaining a second set of imagery data defining a second image of a multi-spectral image type, said second image having a second spatial resolution lower than said first spatial resolution;

obtaining a mapping function specifying a position of pixels in said first image with respect to pixels in said second image;

adapting said mapping function to a high common spatial resolution higher than said second spatial resolution;

generating a third set of imagery data defining a third image of a panchromatic type based on said first set of imagery data and said adapted mapping function and having said high common spatial resolution; and adjusting said mapping function based on a first difference between said first and said third images at said high common spatial resolution.

2. The method of claim 1, wherein the step of adjusting further comprises:

minimizing said first difference based on at least one condition.

3. The method of claim 1, wherein the step of obtaining further comprises:

creating said mapping function based on said first and said second sets of imagery data;

generating a fourth set of imagery data defining a fourth image of a panchromatic type based on said second set of imagery data and having said second spatial resolution;

downsampling said first and fourth images to a low common spatial resolution lower than said second spatial resolution; and modifying said created mapping function based on a second difference between said first downsampled and said fourth downsampled images.

4. The method of claim 3, wherein the step of modifying comprises:
minimizing said second difference based on at least one condition.

5. The method of claim 3, wherein the step of adjusting further comprises:
downsampling said generated third image to said second spatial resolution;
correcting said generated third image based on a comparison of said downsampled third image and said fourth image; and
calculating said first difference using said corrected third image.

6. The method of claim 5, the step of correcting further comprising:
selecting a scaling function to transform said downsampled third image to said generated fourth image; and
applying said scaling function to said generated third image to generate said corrected third image.

7. The method of claim 1, the method further comprising:
if said higher spatial resolution is less than said first spatial resolution, repeating said adapting and said adjusting steps.

8. A system for processing remotely acquired imagery data, comprising:
a mass storage for receiving a first set of imagery data defining a first image of a panchromatic image type having a first spatial resolution and a second set of imagery data defining a second image of a multispectral image type, said second image having a second spatial resolution lower than said first spatial resolution; and
a processing element configured for:
obtaining a mapping function specifying a position of pixels in said first image with respect to pixels in said second image,
adapting said mapping function to a high common spatial resolution higher than said second spatial resolution,
generating a third set of imagery data defining a third image of a panchromatic type based on said first set of imagery data and said adapted mapping function and having said second spatial resolution, and
adjusting said mapping function based on a first difference between said first and said third images at said high common spatial resolution.

9. The system of claim 8, wherein said processing element is further configured to:
minimize said first difference based on at least one condition during said adjusting.

10. The system of claim 8, wherein said processing element is further configured during said obtaining to:
create said mapping function based on said first and said second sets of imagery data,
generate a fourth set of imagery data defining a fourth image of a panchromatic type based on said second set of imagery data and having said second spatial resolution,
downsample said first and fourth images to a low common spatial resolution lower than said second spatial resolution, and
modify said created mapping function based on a second difference between said first downsampled and said fourth downsampled images.

11. The system of claim 10, wherein said processing element is further configured during said modifying to:
minimize said second difference based on at least one condition.

12. The system of claim 10, wherein said processing element is further configured during said adjusting to:
downsample said generated third image to said second spatial resolution;
correct said generated third image based on a comparison of said downsampled third image and said fourth image; and
calculate said first difference using said corrected third image.

13. The system of claim 12, wherein said processing element is further configured during said correcting to:
select a scaling function to transform said downsampled third image to said generated third image; and
apply said scaling function to said generated third image to generate said corrected third image.

14. The system of claim 8, wherein said processing element is further configured to:
if said higher spatial resolution is less than said first spatial resolution, repeat said adapting and said adjusting steps.

15. A computer-readable storage device, having stored thereon a computer program for processing remotely acquired imagery, the computer program having a plurality of code sections, the code sections executable by a computer to cause the computer to perform the steps of:
obtaining a first set of imagery data defining a first image of a panchromatic image type, said first image having a first spatial resolution;
obtaining a second set of imagery data defining a second image of a multi-spectral image type, said second image having a second spatial resolution lower than said first spatial resolution;
obtaining a mapping function specifying a position of pixels in said first image with respect to pixels in said second image;
adapting said mapping function to a high common spatial resolution higher than said second spatial resolution;
generating a third set of imagery data defining a third image of a panchromatic type based on said first set of imagery data and said adapted mapping function and having said high common spatial resolution; and
adjusting said mapping function based on a first difference between said first and said third images at said high common spatial resolution.

16. The computer-readable storage of claim 15, wherein the step of adjusting further comprises:
minimizing said first difference based on at least one condition.

17. The computer-readable storage of claim 15, wherein the step of obtaining further comprises:
creating said mapping function based on said first and said second sets of imagery data;
generating a fourth set of imagery data defining a fourth image of a panchromatic type based on said second set of imagery data and having said second spatial resolution;
downsampling said first and fourth images to a low common spatial resolution lower than said second spatial resolution; and
modifying said created mapping function based on a second difference between said first downsampled and said fourth downsampled images.

18. The computer-readable storage of claim 17, wherein the step of modifying comprises:
   minimizing said second difference based on at least one condition.

19. The computer-readable storage of claim 15, wherein the step of adjusting further comprises:
   downsampling said generated third image to said second spatial resolution;
   correcting said generated third image based on a comparison of said downsampled third image and said fourth image; and
   calculating said first difference using said corrected third image.

20. The computer-readable storage of claim 19, the step of correcting further comprising:
   selecting a scaling function to transform said downsampled third image to said generated fourth image; and
   applying said scaling function to said generated third image to generate said corrected third image.

* * * * *